United States Patent
Chekansky

(10) Patent No.: US 8,025,599 B2
(45) Date of Patent: Sep. 27, 2011

(54) PIVOT ARM TENSIONER WITH SLIDING RATCHET MECHANISM

(75) Inventor: Jason W. Chekansky, Auburn, NY (US)

(73) Assignee: BorgWarner Inc., Auburn Hills, MI (US)

( * ) Notice: Subject to any disclaimer, the term of this patent is extended or adjusted under 35 U.S.C. 154(b) by 340 days.

(21) Appl. No.: 12/442,730

(22) PCT Filed: Oct. 10, 2007

(86) PCT No.: PCT/US2007/080881
§ 371 (c)(1), (2), (4) Date: Mar. 25, 2009

(87) PCT Pub. No.: WO2008/051710
PCT Pub. Date: May 2, 2008

(65) Prior Publication Data
US 2010/0075789 A1    Mar. 25, 2010

Related U.S. Application Data

(60) Provisional application No. 60/862,780, filed on Oct. 25, 2006.

(51) Int. Cl.
*F16H 7/08* (2006.01)
(52) U.S. Cl. .............. 474/109; 474/110; 474/111
(58) Field of Classification Search .......... 474/109–112, 474/117, 138
See application file for complete search history.

(56) References Cited

U.S. PATENT DOCUMENTS

| | | | |
|---|---|---|---|
| 5,184,982 A | 2/1993 | Shimaya et al. | |
| 5,601,505 A * | 2/1997 | Tada | 474/110 |
| 6,120,402 A | 9/2000 | Preston et al. | |
| 6,146,300 A | 11/2000 | Suzuki et al. | |
| 6,155,941 A * | 12/2000 | White et al. | 474/110 |
| 6,165,090 A | 12/2000 | Simpson | |
| 6,447,414 B1 | 9/2002 | White et al. | |
| 6,547,684 B2 * | 4/2003 | Kurohata | 474/111 |
| 6,767,302 B2 * | 7/2004 | Seungpyo | 474/109 |
| 6,849,015 B2 | 2/2005 | Markley et al. | |
| 7,479,077 B2 * | 1/2009 | Markley et al. | 474/111 |
| 7,513,843 B2 | 4/2009 | Markley et al. | |
| 2004/0106483 A1 | 6/2004 | Okabe et al. | |
| 2004/0152548 A1 | 8/2004 | Markley et al. | |
| 2006/0234819 A1 | 10/2006 | Markley et al. | |

FOREIGN PATENT DOCUMENTS

| | | |
|---|---|---|
| JP | 2004084892 | 3/2004 |
| JP | 2004176891 | 6/2004 |
| JP | 2005155796 A | 6/2005 |

OTHER PUBLICATIONS

PCT Search Report; PCT/US2007/080881; Feb. 28, 2008, 10 pages.
Supplementary European Search Report; European Application No. 07844064.1; Oct. 15, 2009; 7 pages.

* cited by examiner

*Primary Examiner* — Sang Kim
(74) *Attorney, Agent, or Firm* — Brown & Michaels, PC

(57) ABSTRACT

An engine chain or belt tensioning system includes a tensioner pivot arm with a ratcheting means that includes backlash in an engine timing system. The tensioner system includes a tensioner pivot arm having a fixed pin, radially projecting ratchet teeth, a tensioner pivot arm biasing device, and a ratchet mechanism that engages the radially projecting ratchet teeth. The ratchet mechanism is oriented such that the tensioner pivot arm freely rotates in one direction, but backdrive is limited in the opposite direction.

14 Claims, 3 Drawing Sheets

PRIOR ART

PIVOT ARM TENSIONER WITH SLIDING RATCHET MECHANISM

REFERENCE TO RELATED APPLICATIONS

This application claims one or more inventions which were disclosed in Provisional Application No. 60/862,780, filed Oct. 25, 2006, entitled "PIVOT ARM TENSIONER WITH SLIDING RATCHET MECHANISM". The benefit under 35 USC §119(e) of the United States provisional application is hereby claimed, and the aforementioned application is hereby incorporated herein by reference.

BACKGROUND OF THE INVENTION

1. Field of the Invention

The present invention relates generally to tensioners used with chain drives in automotive timing and power transmission applications. In particular, the present invention is related to a ratcheting tensioner system.

2. Description of Related Art

A tensioning device, such as a mechanical tensioner, is used as a control device for a power transmission chain, or similar power transmission devices, as the chain travels between a plurality of sprockets. In this device, the chain transmits power from a driving sprocket to a driven sprocket, so that part of the chain is slack and part of the chain is tight. Generally, it is important to impart and maintain a certain degree of tension in the chain to prevent noise, slippage, or the unmeshing of teeth in the case of a toothed chain. Prevention of such slippage is particularly important in the case of a chain-driven camshaft in an internal combustion engine because jumping of teeth will throw off the camshaft timing, possibly causing damage or rendering the engine inoperative.

However, in the harsh environment of an internal combustion engine, various factors can cause fluctuations in the chain tension. For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tensions. Reverse rotation of an engine, occurring for example in stopping or in failed attempts at starting, can also cause fluctuations in chain tension. For these reasons, a mechanism is desired to remove excessive tensioning forces on the tight side of the chain and to ensure the necessary tension on the slack side of the chain.

Mechanical blade and hydraulic tensioners have been used in the past to apply tension to chains. Using mechanical tensioners is a common method of maintaining proper chain tension. In general, these mechanisms employ a lever arm that pushes against the chain on the slack side of the power transmission system. This lever arm must push toward the chain, tightening the chain when the chain is slack, and must be rigid when the chain tightens.

FIG. 1 shows a hydraulic tensioner with a flexible tensioner arm with a blade spring as disclosed in U.S. Pat. No. 6,447,414. The hydraulic tensioner is installed adjacent to a chain 10, which is shown schematically. The chain 10 includes two strands, 12, 14, which each contact opposite sides of the tensioner. The tensioning system includes an arm 16 and a hydraulic tensioner 20 in a hydraulic tensioner housing 40. The arm 16 applies tension along the upper chain strand 12. The second chain strand 14 travels along a stationary arm 42 or path at the bottom of the tensioner housing.

One end 17 of the arm 16 is pivotally attached to a support 22, which forms part of the tensioner housing. The center portion of the arm 16 is supported by the upper portion 24 of the piston 26 of the hydraulic tensioner 20. The free end 19 of the arm 16 is supported by another housing support 28. The arm 16 is positioned so that its upper side 32 is against the underside 34 of the chain strand 12. The bottom side 36 of the arm 16 is positioned against the upper side 24 of the tensioner piston 26. One end 17 of the arm 16 has a single pivot about a point 38, while the other end 19 is free and can slide along one of the housing supports 28. The movement of the crankshaft sprocket 44 forces the chain 10 and the respective strands 12 and 14 into motion. The chain strand 12 wraps about a balance shaft sprocket 46.

FIG. 2 shows a mechanical tensioner as disclosed in U.S. Pat. No. 6,849,015. The tensioner is positioned to control a tight strand 64 and a slack strand 65 of a timing chain 66. An arm 54 carries a shoe 53 positioned outside the slack strand 65 of the timing chain 66. The tensioner arm 54 takes up the slack and applies tension to the chain if moved in the direction of arrow 59. The arm 54 and shoe 53 are preferably attached by a fixed pin 58 to a tensioner pivot arm 51. The tensioner pivot arm 51 has a pivot feature at pivot 52. Tensioning occurs when a force is applied at point 55 in the direction of arrow 56. Rotational force in the direction of arrow 56 results from an extension spring 57 attached at point 55. The type of spring used to apply this rotational force includes a torsional spring, a compression spring, a tension spring, or a hydraulic tensioner.

Excessive reverse rotation of the tensioner pivot arm 51 is limited by adding a ratchet feature, such as ratchet teeth 61, which interface with a pawl 63. Tightening and slackening of the chain is caused by the effect on its environment (for example, the engine block, cylinder head, water, oil, etc.) by temperature changes (for example, a hot engine or a cold engine). To accommodate this tightening and slackening, the assembly requires some amount of backlash. As an example, the backlash is illustrated as a slotted or oversized hole in the pawl 63 at its pivot pin with a spring force applied to the pawl 63 by extension spring 60 in the direction of arrow 62 and against the ratchet teeth 61. The ratchet teeth 61, pawl interface, and pin size, etc. are determined in accordance with chain loads as affected by the various link arms and/or moment arms and suitable ratchet increments.

When the attachment of the arm 54 and shoe 53 to the tensioner pivot arm 51 at point 58 allows the arm 54 and the shoe 53 to pivot as illustrated, the shoe 53 aligns itself to the chain 66, balancing the loads of its two halves against friction while yielding to chain motion (i.e., chordal fall, chain jerk, chain wave, etc.).

SUMMARY OF THE INVENTION

An engine chain or belt tensioning system includes a tensioner pivot arm with a ratcheting means that includes backlash in an engine timing system. The tensioner system includes a tensioner pivot arm having a fixed pin, radially projecting ratchet teeth, a tensioner pivot arm biasing device, and a ratchet mechanism that engages the radially projecting ratchet teeth. The ratchet mechanism is oriented such that the tensioner pivot arm freely rotates in one direction, but backdrive is limited in the opposite direction.

In a first embodiment, the tensioner includes a pivot arm, radially projecting ratchet teeth, a bracket, an engagement mechanism biasing device, and a pivot arm biasing device. The pivot arm is rotatable around a fixed pivot pin. The radially projecting ratchet teeth pivot with the pivot arm about the fixed pivot pin. The bracket has an engagement groove and supports an engagement mechanism, which slidably fits in the groove, for engaging the ratchet teeth. The engagement mechanism biasing device acts on the engagement mechanism in a direction of ratchet tooth engagement. The pivot arm biasing device biases the pivot arm towards a chain or a belt. The groove is oriented relative to the ratchet teeth such that an engaged ratchet tooth over-extends in a direction of the chain or the belt before the engagement mechanism clears the engaged ratchet tooth.

In a second embodiment, the tensioner includes a pivot arm, radially projecting ratchet teeth, a pawl, a bracket, an engagement mechanism biasing device, and a pivot arm biasing device. The pivot arm is rotatable around a fixed pivot pin. The radially projecting ratchet teeth pivot with the pivot arm about the fixed pivot pin. The pawl engages the ratchet teeth. The bracket has a groove and includes an engagement mechanism engaging the pawl and slidably fit in the groove. The engagement mechanism biasing force acts on the engagement mechanism in a direction of pawl engagement with the ratchet teeth. The pivot arm biasing device biases the pivot arm towards a chain or a belt. When transverse travel of the pawl and the engagement mechanism is limited by geometry of the groove, further rotation of the pivot arm and ratchet teeth forces the pawl to disengage the ratchet teeth such that tooth jump occurs.

DETAILED DESCRIPTION OF THE INVENTION

Figure 1:
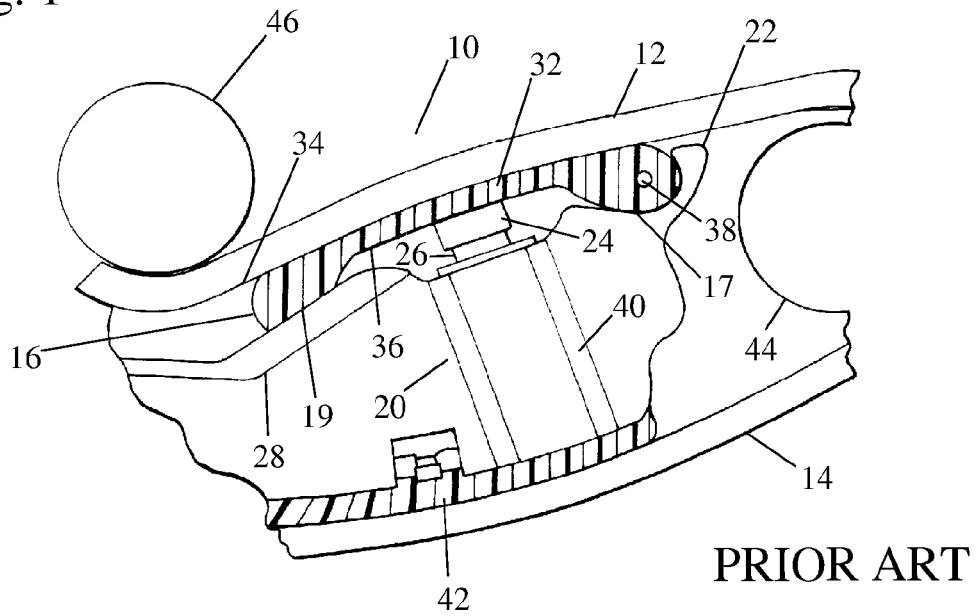
FIG. 1 shows a hydraulic tensioner as known in the prior art.
Figure 2:
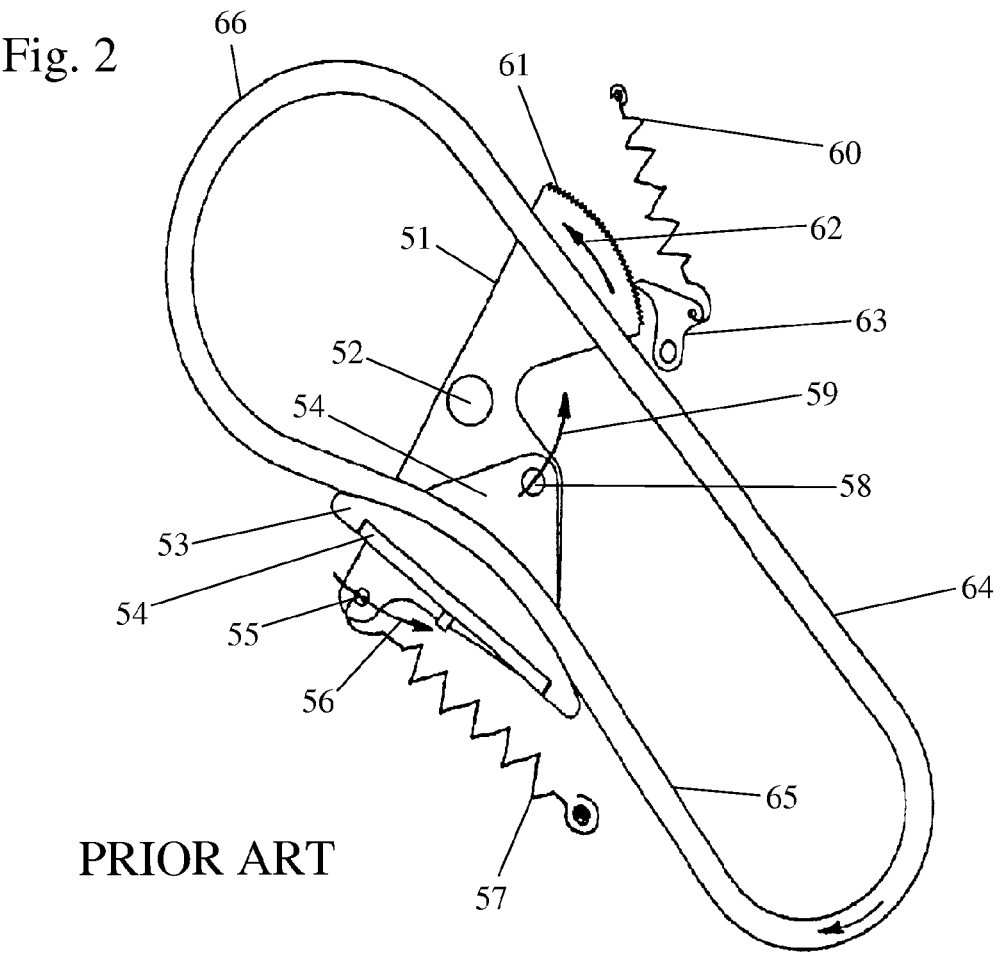
FIG. 2 shows a mechanical tensioner as known in the prior art.

An engine chain or belt tensioning system of the present invention includes a tensioner pivot arm with a ratcheting means that includes backlash (backdrive) in an engine timing system. The tensioner system includes a tensioner pivot arm having a fixed pivot pin and radially projecting ratchet teeth affixed to the tensioner pivot arm. In one embodiment, the tensioner arm is preferably made of plastic. The pivot arm is biased by a tensioner pivot arm biasing device. The pivot arm biasing device is preferably a spring, including, but not limited to, a torsional spring, a compression spring, or a tension spring. Alternatively, the pivot arm biasing device is a hydraulic piston. An engagement mechanism, such as a pin or ball, engages the radially projecting ratchet teeth. A bracket slidably contains the pin or ball, and a biasing force, either mechanical or gravitational, biases the pin or ball. Some examples for the biasing force include, but are not limited to, a torsion spring, a compression spring, an extension spring, or a leaf spring. The radially projecting ratchet teeth pivot about the same fixed pivot point as the tensioner pivot arm. In one embodiment, the bracket and pivot pin are positioned outside of the chain or belt strand.

Excessive reverse rotation of the tensioner pivot arm is preferably limited by adding a ratchet feature, such as ratchet teeth, which interfere with a pin or ball that slidably fits in a groove. Tightening and slackening of the chain is caused by the engine operating environment (such as temperature, thermal contraction, etc.) and inputs from the drive and driven components. To accommodate this tightening and slackening, the assembly requires some amount of backlash.

Ratcheting and backlash of the tensioner pivot arm is accomplished by allowing the pin or ball that engages the ratchet teeth to fit slidably in a groove of a stationary bracket. Orientation of the groove relative to the ratchet teeth requires the engaged ratchet tooth to over-extend in the direction of the chain (counterclockwise in the figures) before the pin or ball clears the ratchet tooth. Once clear of the previously engaged ratchet tooth, the pin or ball slidably engages with the succeeding ratchet tooth. Since ratchet over-rotation was required for tooth jump, there is a limited amount of allowable backdrive, eliminating a zero-backdrive condition of the tensioner pivot arm system.

A second embodiment of the present invention includes a tensioner pivot arm having a fixed pivot pin, radially projecting ratchet teeth affixed to the tensioner pivot arm that rotate about the same fixed pivot as the tensioner pivot arm, a pawl that engages the radially projecting ratchet teeth, a pin affixed to the pawl that slidably fits in a groove of a bracket, and a biasing force, either mechanical or gravitational, acting on the pawl in the direction of ratchet tooth engagement.

Ratcheting and backlash of the tensioner pivot arm is accomplished by allowing the pin and pawl to be slidably contained by the bracket. As the tensioner pivot arm rotates in the direction of free rotation, the pawl and pin slide in the groove to the point at which transverse pawl and pin travel is limited by the groove geometry. At this point, further rotation of the tensioner pivot arm and ratchet teeth force the pawl to disengage the ratchet tooth to the point where tooth jump occurs. Directly following tooth jump, tensioner pivot arm backdrive is allowed and limited by the slidable fit between the pawl, pin, and bracket groove. This orientation allows for limited backdrive of the tensioner pivot arm, even at times directly succeeding tooth jump.

Figure 3:
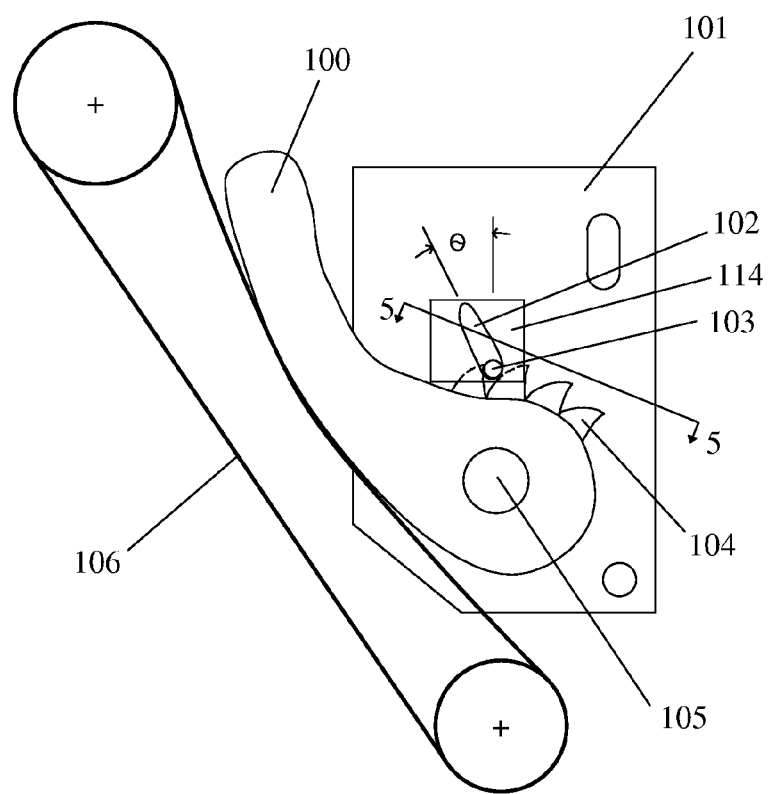
FIG. 3 shows a tensioner of the present invention.
Figure 6:
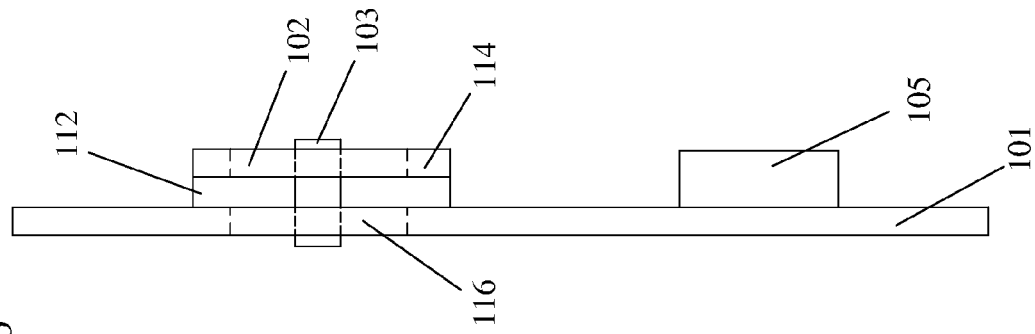
FIG. 6 shows a side view of the mounting bracket of FIG. 3.
Figure 5:
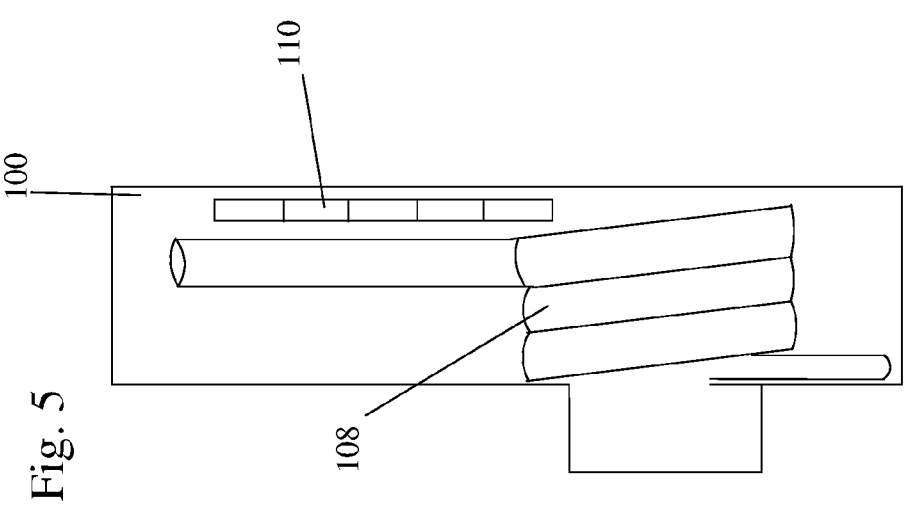
FIG. 5 shows a tensioner pivot arm with a ratchet bracket overmold along lines 5-5 of FIG. 3 in an embodiment of the present invention.

FIGS. 3, 5, and 6 show a tensioner in one embodiment of the present invention. The tensioner includes a tensioner pivot arm 100 with a ratcheting means that includes backlash in an engine timing system. The tensioner pivot arm 100 has a fixed pivot pin 105 and a ratchet gear 110 that includes a plurality of radially projecting ratchet teeth 104 affixed to the tensioner pivot arm 100. The radially projecting ratchet teeth 104 pivot about the same fixed pivot pin 105 as the tensioner pivot arm 100. The tensioner also includes a device to bias the tensioner pivot arm. Although a torsion spring 108, which biases the tensioner pivot arm 100, is shown in FIG. 5, other biasing devices including, but not limited to, a compression spring, a tension spring, or a hydraulic piston tensioner, may be substituted for the torsion spring. An engagement mechanism, such as a pin or ball 103, engages the radially projecting ratchet teeth 104. The engagement mechanism preferably fits slidably in a groove 102 of a bracket 101. The pin or ball 103 is biased by a biasing force that is preferably either mechanical or gravitational.

As best seen in FIG. 6, to form the groove 102 for supporting the pin 103, a portion of the bracket 101 is preferably pierced on 3 sides to form a flap. The flap is then folded back to form a U-shape. The bottom 112 of the U extends outward from the main part of the bracket 101, and the remainder 114 of the flap runs parallel to the bracket 101. In addition to the groove 102 on the outer part 114, there is preferably an inner groove 116 in the bracket 101 such that the grooves support the pin or ball 103 on each end. The ratchet teeth 104 preferably run between the bracket 101 and the flap 114, engaging the middle part of the pin 103.

In order to maintain the pin in the grooves, the pin is preferably either materially deformed to be riveted like a chain pin or held in place by washers and a rivet. In either case, material of the pin is deformed such that it becomes non-circular. This deformation does not allow the pin to travel laterally within the groove but does not restrict motion in the direction of the groove.

Figure 7:
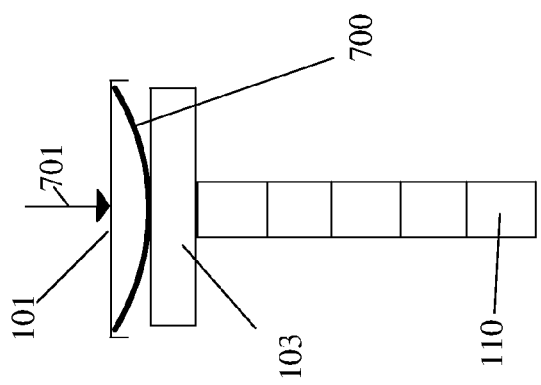
FIG. 7 shows one example of a biasing force that biases the pin or ball in an embodiment of the present invention.

A leaf spring 700 is shown in FIG. 7 as one example of the biasing force. The leaf spring 700 biases the pin or ball 103 in a bias direction 701. In the embodiment of FIG. 6, the spring 700 is preferably mounted to the top of the U section 112 of the bracket 101 to bias the pin or ball 103 toward engagement with the ratchet teeth. Other examples for a biasing force include, but are not limited to, a torsion spring, a compression spring, or an extension spring. In one embodiment, the bracket 101 and pivot pin 105 are positioned outside of the chain 106 or belt strand.

Excessive reverse rotation of the tensioner pivot arm 100 is preferably limited by adding a ratchet feature, such as ratchet teeth 104, which interferes with the pin or ball 103 that slidably fits in the groove 102 of the bracket 101. One alternative ratchet feature is one or more pawls, which differ from the pawl 207 discussed below. The groove 102 is oriented relative to the ratchet teeth 104 at an angle θ with respect to a radial line from the fixed pivot pin in such a way to require the engaged ratchet tooth to over-extend in the free rotation direction before the pin or ball 103 clears the ratchet tooth. The angle θ determines the amount of allowable backdrive following tooth jump such that increasing the angle increases the allowed backtravel and decreasing the angle decreases the allowed back travel. Once clear of the previously engaged ratchet tooth, the pin or ball 103 slidably engages with the succeeding ratchet tooth. Since ratchet over rotation is required for tooth jump, there is a limited amount of allowable backdrive, eliminating a zero-backdrive condition of the tensioner pivot arm 100. The value of the angle θ is preferably tailored for optimal allowable backdrive in the specific application for each tensioner.

Figure 4:
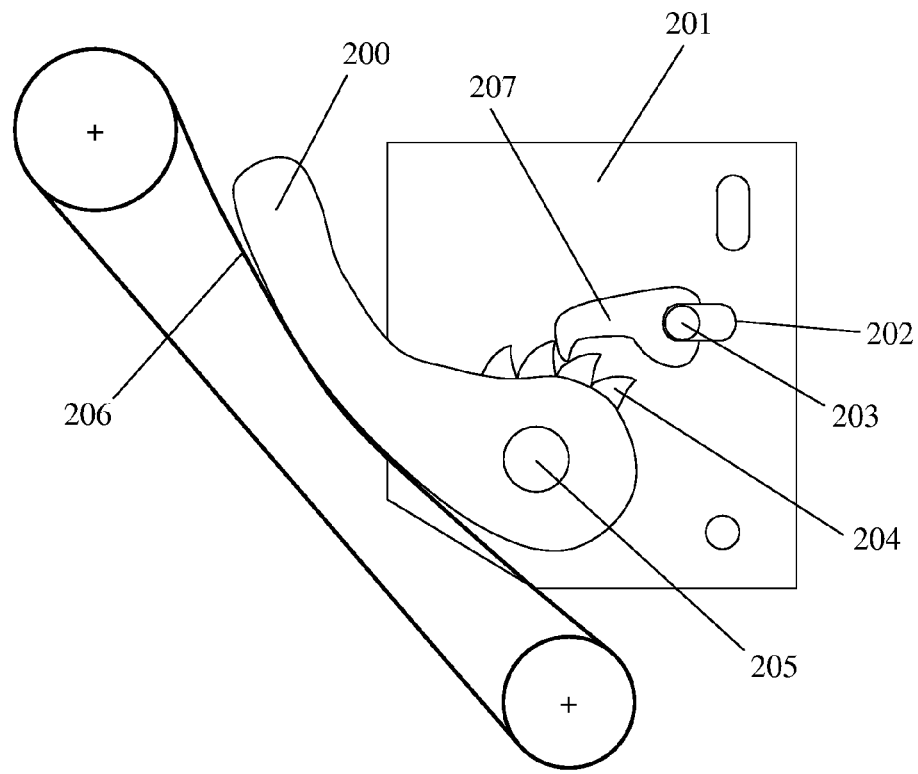
FIG. 4 shows a tensioner in an alternative embodiment of the present invention.

FIG. 4 shows a tensioner in a second embodiment of the present invention. The tensioner in this embodiment includes a tensioner pivot arm 200 having a fixed pivot pin 205, and radially projecting ratchet teeth 204 affixed to the tensioner pivot arm 200 that rotate about the same fixed pivot as the tensioner pivot arm 200. A pawl 207 engages the radially projecting ratchet teeth 204. A pin 203, slidably fit in a groove 202 of a bracket 201, is affixed to the pawl 207. A biasing force, either mechanical or gravitational, acts on the pawl 207 in the direction of ratchet tooth engagement.

As the tensioner pivot arm 200 rotates in the direction of the chain slack strand 206, the pawl 207 and pin 203 slide in the groove 202 to the point at which transverse pawl 207 and pin 203 travel is limited by the groove 202 geometry. At this point, further rotation of the tensioner pivot arm 200 and ratchet teeth 204 force the pawl 207 to disengage the ratchet teeth 204 to the point where tooth jump occurs. Tensioner pivot arm backdrive is allowed directly following tooth jump, but is limited by the slidable fit between the pawl 207, the pin 203, and the geometry of the bracket groove 202. This orientation allows for limited backdrive of the tensioner pivot arm, even at times directly succeeding tooth jump.

There are many advantages to the present invention. For example, the ratchet mechanism reduces tensioner pivot arm back travel, maintaining proper control of the chain and eliminating situations of low chain tension and the noise resulting from this condition. In addition, the allowed backlash of the system eliminates situations of excessive chain tension and any noise resulting from insufficient tensioner pivot arm back travel and excessive chain tension.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner comprising:
    a) a pivot arm rotatable around a fixed pivot pin;
    b) a plurality of radially projecting ratchet teeth that pivot with the pivot arm about the fixed pivot pin;
    c) a bracket having an engagement groove and supporting an engagement mechanism for engaging the ratchet teeth and slidably fit in the groove;
    d) an engagement mechanism biasing device that acts on the engagement mechanism in a direction of ratchet tooth engagement; and
    e) a pivot arm biasing device that biases the pivot arm towards a chain or a belt;
    wherein the groove is oriented relative to the ratchet teeth such that a first engaged ratchet tooth over-extends in a direction of the chain or the belt before the engagement mechanism clears the first engaged ratchet tooth.

2. The tensioner of claim 1, wherein the ratchet teeth are shaped such that once the engagement mechanism clears the first engaged ratchet tooth, the engagement mechanism engages a second engaged ratchet tooth.

3. The tensioner of claim 1, wherein the ratchet teeth, the bracket, and the engagement mechanism are formed such that the tensioner has a limited amount of allowable backlash.

4. The tensioner of claim 1, wherein the engagement mechanism comprises a ball.

5. The tensioner of claim 1, wherein the engagement mechanism comprises a pin.

6. The tensioner of claim 1, wherein the engagement mechanism biasing device is selected from the group consisting of:
    a) a torsion spring;
    b) a compression spring;
    c) an extension spring; and
    d) a leaf spring.

7. The tensioner of claim 1, wherein the pivot arm biasing device is selected from the group consisting of:
    a) a torsional spring;
    b) a compression spring;
    c) a tension spring; and
    d) a hydraulic piston.

8. The tensioner of claim 1, wherein the groove is oriented at an angle θ with respect to a radial line from the fixed pivot pin that determines an amount of allowable backlash after the engagement mechanism clears the first engaged ratchet tooth.

9. The tensioner of claim 1, wherein the bracket has a supporting groove and further comprises a flap having the engagement groove, formed from the bracket, and folded such that the engagement groove and the supporting groove support the ends of the engagement mechanism.

10. A tensioner comprising:
    a) a pivot arm rotatable around a fixed pivot pin;
    b) a plurality of radially projecting ratchet teeth that pivot with the pivot arm about the fixed pivot pin;
    c) a pawl that engages the ratchet teeth;

d) a bracket having a groove and comprising an engagement mechanism engaging the pawl and slidably fit in the groove;

e) an engagement mechanism biasing device that acts on the engagement mechanism in a direction of pawl engagement with the ratchet teeth; and f) a pivot arm biasing device that biases the pivot arm towards a chain or a belt;

such that when transverse travel of the pawl and the engagement mechanism is limited by geometry of the groove, further rotation of the pivot arm and ratchet teeth forces the pawl to disengage the ratchet teeth such that tooth jump occurs.

11. The tensioner of claim 10, wherein the bracket, the pawl, and the engagement mechanism are formed such that backlash is allowed directly following tooth jump, but is limited by the slidable fit between the pawl and geometry of the groove.

12. The tensioner of claim 10, wherein the engagement mechanism is a pin.

13. The tensioner of claim 10, wherein the engagement mechanism biasing device is selected from the group consisting of:

a) a torsion spring;
b) a compression spring;
c) an extension spring; and
d) a leaf spring.

14. The tensioner of claim 10, wherein the pivot arm biasing device is selected from the group consisting of:

a) a torsional spring;
b) a compression spring;
c) a tension spring; and
d) a hydraulic piston.

* * * * *